(12) United States Patent
Sheppard et al.

(10) Patent No.: US 10,504,138 B2
(45) Date of Patent: Dec. 10, 2019

(54) METHODS AND APPARATUS TO IMPROVE REACH CALCULATION EFFICIENCY

(71) Applicant: The Nielsen Company (US), LLC, New York, NY (US)

(72) Inventors: Michael Sheppard, Brooklyn, NY (US); Jonathan Sullivan, Hurricane, UT (US); Peter Lipa, Tucson, AZ (US); Peter Campbell Doe, Ridgewood, NJ (US); Paul Donato, New York, NY (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 450 days.

(21) Appl. No.: 14/984,310

(22) Filed: Dec. 30, 2015

(65) Prior Publication Data

US 2017/0061470 A1  Mar. 2, 2017

Related U.S. Application Data (60) Provisional application No. 62/212,097, filed on Aug. 31, 2015.

(51) Int. Cl.
  *G06Q 30/02*  (2012.01)
(52) U.S. Cl.
  CPC ..... *G06Q 30/0244* (2013.01); *G06Q 30/0201* (2013.01); *G06Q 30/0242* (2013.01)
(58) Field of Classification Search
  CPC .......... G06Q 30/0242; G06Q 30/0244; G06Q 30/0245; G06Q 30/0246; G06Q 30/0254; G06Q 30/0201; G06Q 30/0207

USPC .......... 705/14.41, 14.43, 14.44, 14.45, 14.54
See application file for complete search history.

(56) References Cited

U.S. PATENT DOCUMENTS

| | | |
|---|---|---|
| 6,937,996 B1 | 8/2005 | Forsythe et al. |
| 7,533,399 B2 | 5/2009 | Ma et al. |
| 7,613,664 B2 | 11/2009 | Riezler et al. |
| 8,954,580 B2 | 2/2015 | Landa et al. |
| 2006/0053110 A1 | 3/2006 | McDonald et al. |
| 2006/0123448 A1 | 6/2006 | Ma et al. |

(Continued)

OTHER PUBLICATIONS

Kapur, J. N., and Kesavan, H. K., Entropy Optimization Principles and their Applications, Kluwer Academic Publishers, 1992, downloaded Apr. 12, 2018 from https://link.springer.com/content/pdf/10.1007%2F978-94-011-2430-0_1.p (Year: 1992).*

(Continued)

*Primary Examiner* — Scott D Gartland
(74) *Attorney, Agent, or Firm* — Hanley, Flight & Zimmerman (57) ABSTRACT

Methods, apparatus, systems and articles of manufacture are disclosed to improve reach calculation efficiency. An example method includes estimating, with a processor, a sample distribution of marketing data to generate a maximum entropy distribution, generating, with the processor, a geometric distribution based on estimating a minimum cross entropy of (a) the maximum entropy distribution and (b) the sample distribution of marketing data, and improving calculation efficiency of the public reach of the sample distribution of marketing data by generating, with the processor, conserved quantity expressions of the geometric distribution.

10 Claims, 8 Drawing Sheets

(56) References Cited

U.S. PATENT DOCUMENTS

| | | |
|---|---|---|
| 2006/0224552 A1 | 10/2006 | Riezler et al. |
| 2008/0228543 A1 | 9/2008 | Doe et al. |
| 2009/0197582 A1 | 8/2009 | Lewis et al. |
| 2012/0323675 A1 | 12/2012 | Paparo |
| 2013/0268351 A1 | 10/2013 | Abraham et al. |
| 2014/0278930 A1* | 9/2014 | Brixius .............. G06Q 30/0242 705/14.45 |
| 2014/0289017 A1 | 9/2014 | Trenkle et al. |
| 2015/0332317 A1 | 11/2015 | Cui et al. |

OTHER PUBLICATIONS

Kapur, J. N., and Kesavan, H. K., Entropy Optimization Principles and their Applications, Kluwer Academic Publishers, p. 3-20,1992, downloaded Apr. 12, 2018 from https://link.springer.eom/content/pdf/10.1007%2F978-94-011 (Year: 1992).*

Kesavan, H. K., and Kapur, J. N., The Generalized Maximum Entropy Principle, IEEE Transactions on Systems, Man, and Cybernetics, vol. 19, No. 5, Sep./Oct. 1989 (downloaded Apr. 13, 2018 from https://ieeexplore.ieee.org/stamp.jsp?tp=& arnumber =44019) (Year: 1989).*

Wikipedia, "Kullback-Leibler Divergence," last modified on Dec. 4, 2015, retrieved from <https://en.wikipedia.org/w/index.php?title=Kullback-Leibler_divergence . . . >, retrieved on Dec. 4, 2015 (9 pages).

* cited by examiner

METHODS AND APPARATUS TO IMPROVE REACH CALCULATION EFFICIENCY

RELATED APPLICATION

This patent claims the benefit of, and priority to U.S. Provisional Application Ser. No. 62/212,097, entitled "METHODS AND APPARATUS TO CALCULATE GROSS RATINGS POINTS AND REACH WITH ENTROPY," which was filed on Aug. 31, 2015, and is hereby incorporated herein by reference in its entirety.

FIELD OF THE DISCLOSURE

This disclosure relates generally to market data analysis, and, more particularly, to methods and apparatus to improve reach calculation efficiency.

BACKGROUND

In recent years, market analysts have measured observation impressions associated with media, in which impressions may include sales of an advertised product, observations of an advertisement, observations of a particular broadcast event, etc. To gain an understanding of an effectiveness of a particular media distribution technique (e.g., advertisements via television, advertisements via Internet media, etc.), the analysts typically calculate a gross rating point (GRP). The GRP is calculated as a ratio of a number of observed impressions and a defined population and, to account for unique impressions, the analysts may also calculate a corresponding reach metric, which is a ratio of a unique number of exposures and the defined population.

DETAILED DESCRIPTION

In recent years, a gross rating point (GRP) metric, which is sometimes referred to as an average or a mean, was calculated as a ratio of a number of observed impressions and a defined population, but the GRP does not account for whether such impressions were unique to just one individual from the defined population. As such, a reach metric is typically used together with the GRP calculation to consider unique impressions. The reach metric is calculated as a ratio of a unique number of exposures and the defined population.

A market analyst typically measures both the GRP and the reach empirically for a particular event (e.g., an advertising campaign), but may wish to understand a corresponding reach value in the event a newly proposed (e.g., published) GRP value occurs. For example, a raw (e.g., initial) GRP and raw reach value measured from panelist observations may reveal values of 100 and 30, respectively. However, this example GRP value is associated with a particular event (e.g., advertising campaign) having a particular amount of advertising revenue applied thereto. The market analyst may know that one or more changes to the marketing campaign can boost the GRP value from 100 to 200 (e.g., spending more advertising dollars to utilize a greater number of media outlets, such as purchasing more commercial air-time, and/or purchasing commercial air-time during prime viewership times of day). Using the originally provided market data, the analyst applies a model to scale the GRP up from 100 to a value of 200 to determine a corresponding reach value at the newly published GRP value.

Traditionally, the market analyst determines a corresponding published reach value from the proposed published GRP value by applying a negative binomial distribution (NBD) model. The NBD models a frequency distribution to reflect a percentage of the population that participated in the impression(s), and assumes an infinite domain. When the NBD model is applied to circumstances having a particular number of samples, accurate results may occur, however the NBD model has erroneous results for certain feasibility regions, particularly when the number of samples is relatively low or below a threshold value. In the event such problematic feasibility regions occur in view of the provided market data (frequency distribution), traditional techniques applied by analysts include application of a Poisson distribution, which has become an industry standard. Unfortunately, application of the Poisson distribution produces results that are independent of the published GRP and/or the original market data (frequency distribution). Stated differently, application of the NBD model presupposes a particular distribution in an attempt to fit the data to that distribution, and predictions are derived therefrom.

Examples disclosed herein prevent any assumption and/or presupposition of which distribution to use and, instead, preserve the integrity of the known marketing data to derive a distribution that best fits that data. Further, examples disclosed herein apply a principle of maximum entropy and minimum cross entropy to solve for the proper distribution that best fits the market data. Entropy reflects disorder in a distribution, and examples disclosed herein apply the principle of maximum entropy to derive the most accurate distribution in an effort to reduce uncertainty. Because a maximum entropy exposes what is maximally uncertain about what is unknown, any other distribution, such as an assumed NBD distribution, means that more information is being forced into that distribution/model that does not reflect the empirical data (e.g., the provided market data). Examples disclosed herein determine a maximum entropy of which observations are at zero (e.g., zero impressions), which is a portion of the NBD model that produces the most error. Additionally, examples disclosed herein apply the minimum cross entropy to modify the maximum entropy distribution to create a new distribution that still depends on values from the empirical observations, unlike the application of the Poisson distribution.

As described above, GRP is a metric to measure impressions in relation to the number of people in target data for an advertising campaign, which is calculated in a manner consistent with example Equation 1.

$$GRP = 100 * \frac{\text{Impressions}}{\text{Defined Population}}. \quad \text{Equation 1}$$

Additionally, as described above, reach is the total number of different people in the defined population exposed, at least once, to the campaign during a given period, which is calculated in a manner consistent with example Equation 2.

$$\text{Reach} = 100 * \frac{\text{Unique People Exposed}}{\text{Defined Population}}. \quad \text{Equation 2}$$

A mathematical constraint between a GRP calculation and a corresponding reach calculation is that the GRP value must always be greater-than or equal to the reach value. For instance, if five (5) impressions are detected and/or otherwise observed in a distribution having a population of ten (10) people, then a corresponding GRP value is fifty (50). Because reach reflects an indication of how many unique exposures occurred, the number of unique exposures mathematically cannot exceed the example five (5) impressions detected.

In the event the analyst can improve (e.g., increase) the GRP of the original distribution by applying one or more marketing drivers (sometimes referred to as "scaling-up"), then the analyst would also like to justify whether such marketing drivers will be effective and/or a degree by which such marketing drivers will be effective by determining a corresponding reach value associated with the scaled-up GRP value. Traditional application of the NBD model have been used by market analysts under the qualified assumption that a scaled-up frequency distribution follows the curve/distribution of that NBD model, as shown in FIG. 1.

Figure 1:
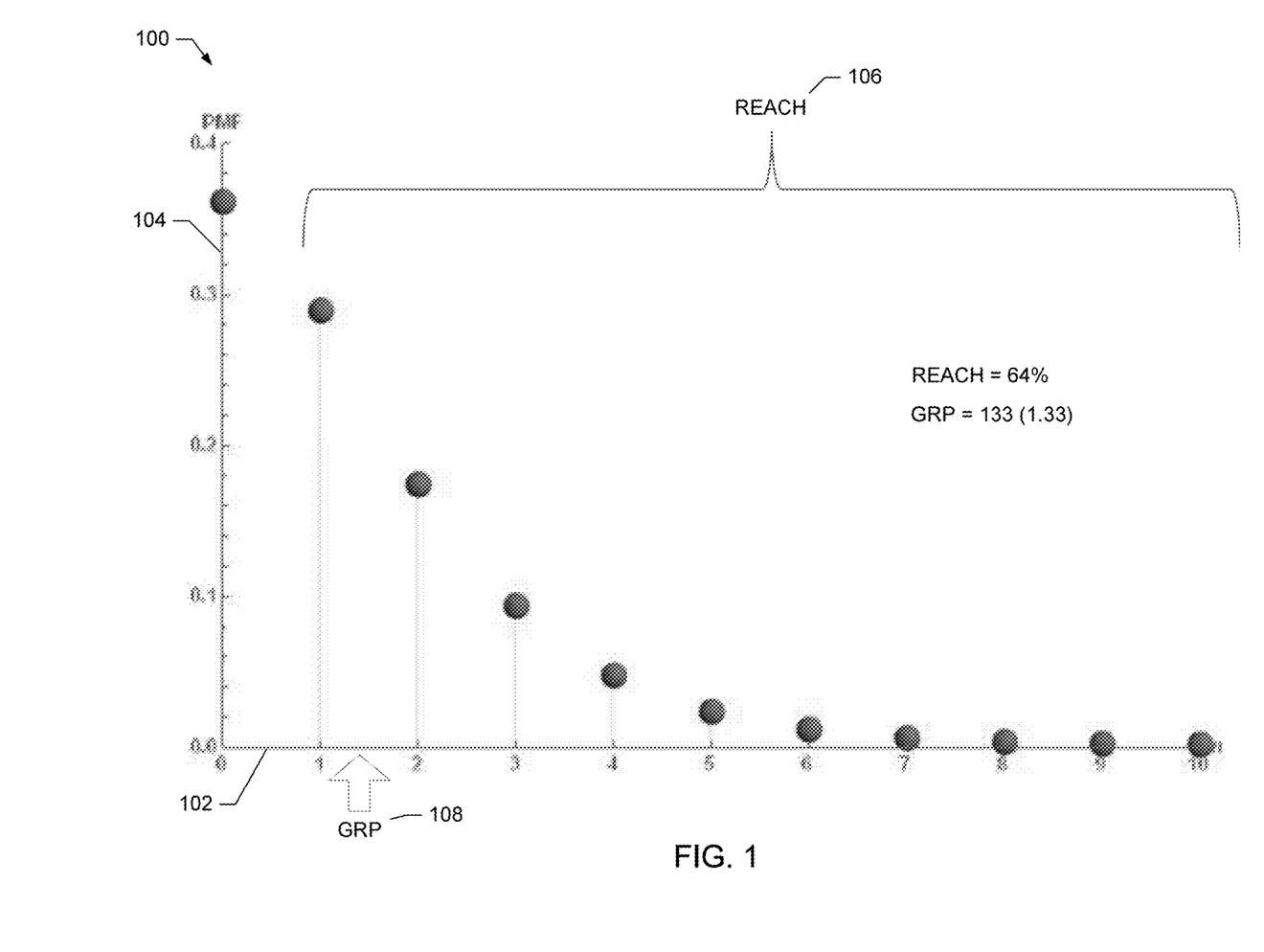
FIG. 1 is a schematic illustration of a negative binomial distribution model traditionally applied to published reach calculations.

In the illustrated example of FIG. 1, an NBD curve 100 includes an x-axis of GRP values 102 and a y-axis of probability 104. As described above, because the GRP reflects an average, the non-zero reach probabilities 106 correspond to an example GRP of 1.33 (or 133 after traditional multiplication of the ratio of example Equation 1 by 100) 108. The reach corresponding to the example GRP of FIG. 1 is 64 (or 64%) to reflect unique or different exposures of the audience. Because the NBD curve 100 includes all participants of a given defined population (e.g., the denominator of example Equations 1 and 2), a corresponding probability at zero is known to be 36% (100−64). The NBD in the context of GRP and reach is defined in a manner consistent with example Equation 3.

$$P(i) = \frac{\Gamma(k+i)}{\Gamma(k)\Gamma(i+1)} * \left(\frac{1}{(1+a)}\right)^k * \left(\frac{a}{1+a}\right)^i. \quad \text{Equation 3}$$

In the illustrated example of Equation 3, P(i) reflects a proportion of viewing an $i^{th}$ spot/index (e.g., advertisement), $\Gamma$ reflects a Gamma function, and a and k are parameters of the model. As described above, application of the NBD model presupposes a particular distribution/shape, to which provided observation data (e.g., market data) is forced. When the market analyst scales-up a given distribution having a new/published GRP value, the NBD is solved for a proportion of zero (0) viewing spots (i.e., P(0)), in which the NBD equation of Equation 3 simplifies to example Equation 4.

$$P(0) = \left(\frac{1}{1+a}\right)^k = 1 - \frac{\text{Raw Reach}}{100}. \quad \text{Equation 4}$$

Parameters a and k are isolated in a manner consistent with example Equation 5.

$$\text{Expected Value} = a*k = \frac{\text{Raw GRP}}{100}. \quad \text{Equation 5}$$

Under the assumption that any scaled-up distribution will reasonably conform to the NBD, the new/published/target GRP is scaled up to generate a modified parameter a, which is derived in example Equation 6 as scaled parameter A.

$$A = a * \frac{\text{Published GRP}}{\text{Raw GRP}}. \quad \text{Equation 6}$$

In connection with scaled parameter A, a new published reach corresponding to the published GRP is calculated in a manner consistent with example Equations 7 and 8.

$$P(0) = \left(\frac{1}{1+A}\right)^k = 1 - \frac{\text{Published Reach}}{100}. \quad \text{Equation 7}$$

$$P(i) = \frac{\Gamma(k+i)}{\Gamma(k)\Gamma(i+1)} * \left(\frac{1}{1+A}\right)^k * \left(\frac{A}{1+A}\right)^i. \quad \text{Equation 8}$$

To illustrate limitations of the traditionally applied NBD model, assume an observed distribution includes a GRP value of 100 with a corresponding reach value of 80. Applying example Equation 5 and solving for parameters a and k results in a value of −0.647 for parameter a, and a value of −1.546 for parameter k. For varying values of index (i), corresponding probability values result, as shown in Table 1 below.

TABLE 1

| i | P(i) |
|---|---|
| 0 | 0.200 |
| 1 | 0.567 |
| 2 | 0.283 |
| 3 | −0.079 |
| 4 | 0.052 |
| 5 | −0.047 |

As shown in the illustrated example of Table 1, application of the NBD model breaks down for the $3^{rd}$ and the $5^{th}$ index values, which produce erroneous negative values for probability. The qualified assumptions made by analysts using the NBD model described above include at least two considerations, the first of which is that the applied raw (e.g., initial) GRP is greater than or equal to the reach. This consideration is met by the example above, where GRP is 100 and the corresponding reach is 80. However, the second consideration includes an inherent limitation of the NBD model for those combinations of GRP and reach that are not themselves mathematically impossible, but nonetheless impossible when employed with the NBD model.

Figure 2:
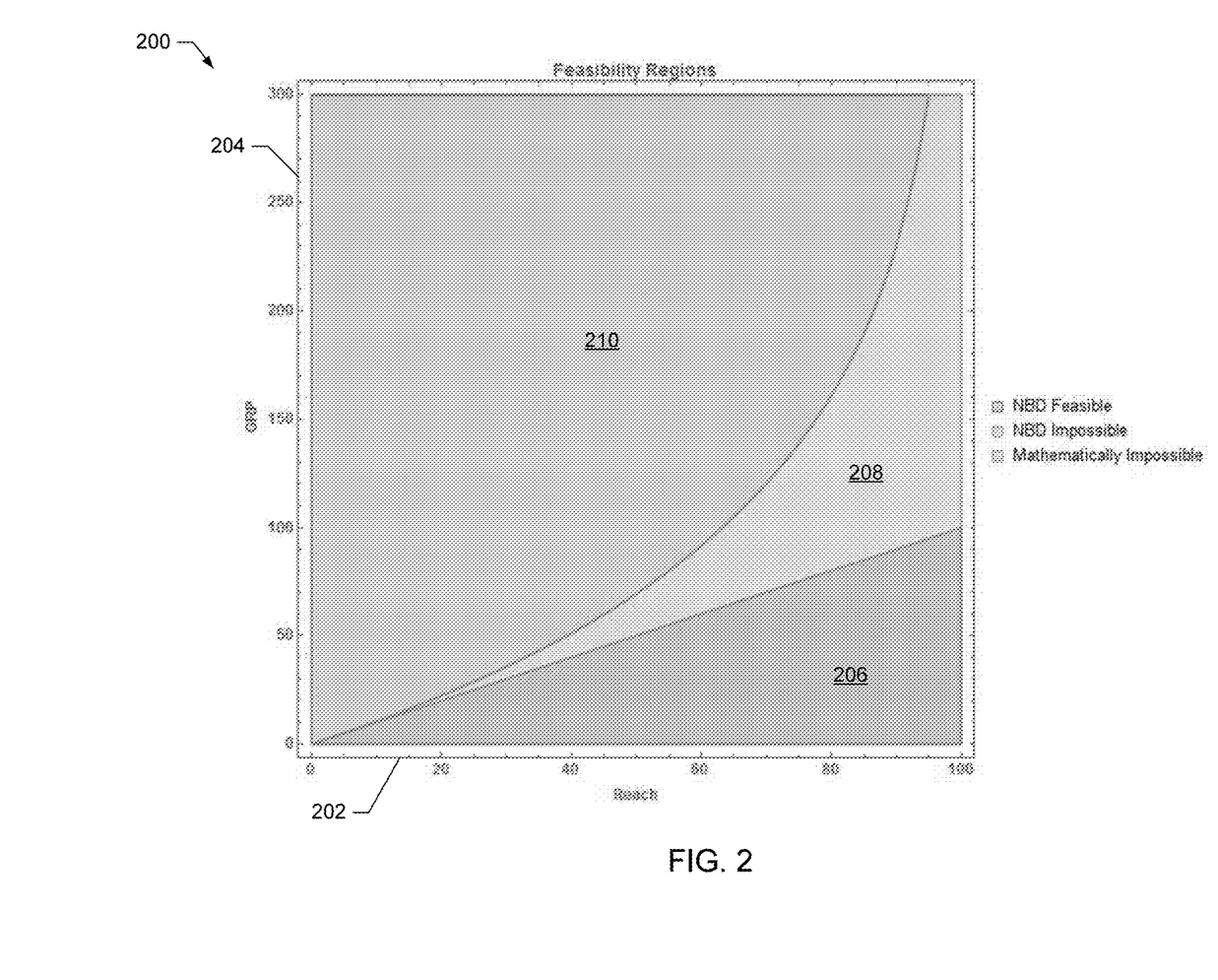
FIG. 2 is an example feasibility region plot that identifies feasibility regions for traditionally applied methods to calculate published reach values.

FIG. 2 illustrates a feasibility region plot 200 associated with the NBD model. In the illustrated example of FIG. 2, the feasibility region plot 200 includes an x-axis to reflect reach values 202 and a y-axis to reflect GRP values 204. The example feasibility region plot 200 also includes a mathematically impossible region 206, in which the GRP is not greater than or equal to the reach. However, the example feasibility region plot 200 also includes an NBD-impossible region 208, which may reflect valid values for GRP and reach that could be observed in market data, but cause the NBD model to fail, as shown by the results of example Table 1 above. Finally, the example feasibility region plot 200 includes an NBD-feasible region 210 for which corresponding values of GRP and reach will not cause the NBD model to fail.

When an analyst identifies circumstances where combinations of GRP and reach reside within the example NBD-impossible region 206, such traditional solutions apply a Poission distribution. In some examples, the Poission distribution is applied as a work-around to the NBD-impossible region 206 when the corresponding a parameter is calculated at a value less than zero. The Poission distribution replaces the NBD approach and is used with an alternate parameter lambda ($\lambda$) as shown in example Equation 9.

$$\lambda = \frac{\text{Published } GRP}{100}. \qquad \text{Equation 9}$$

The published reach is then calculated in a manner consistent with example Equation 10 for a proportion of viewing zero (0) spots (advertisements).

$$\text{Proportion Viewing 0 Spots} = e^{-\lambda} = 1 - \frac{\text{Published Reach}}{100}. \qquad \text{Equation 10}$$

To determine a corresponding frequency distribution for proportions viewing any number of non-zero spots, example Equation 11 is applied.

$$\text{Proportion Viewing } i \text{ Spots} = \frac{\lambda^i e^{-\lambda}}{i!}. \qquad \text{Equation 11}$$

While application of the Poission distribution as shown above has been adopted as an industry standard, worth noting is that this approach no longer reflects any influence of the published GRP and completely ignores the original sample distribution.

Figure 3:
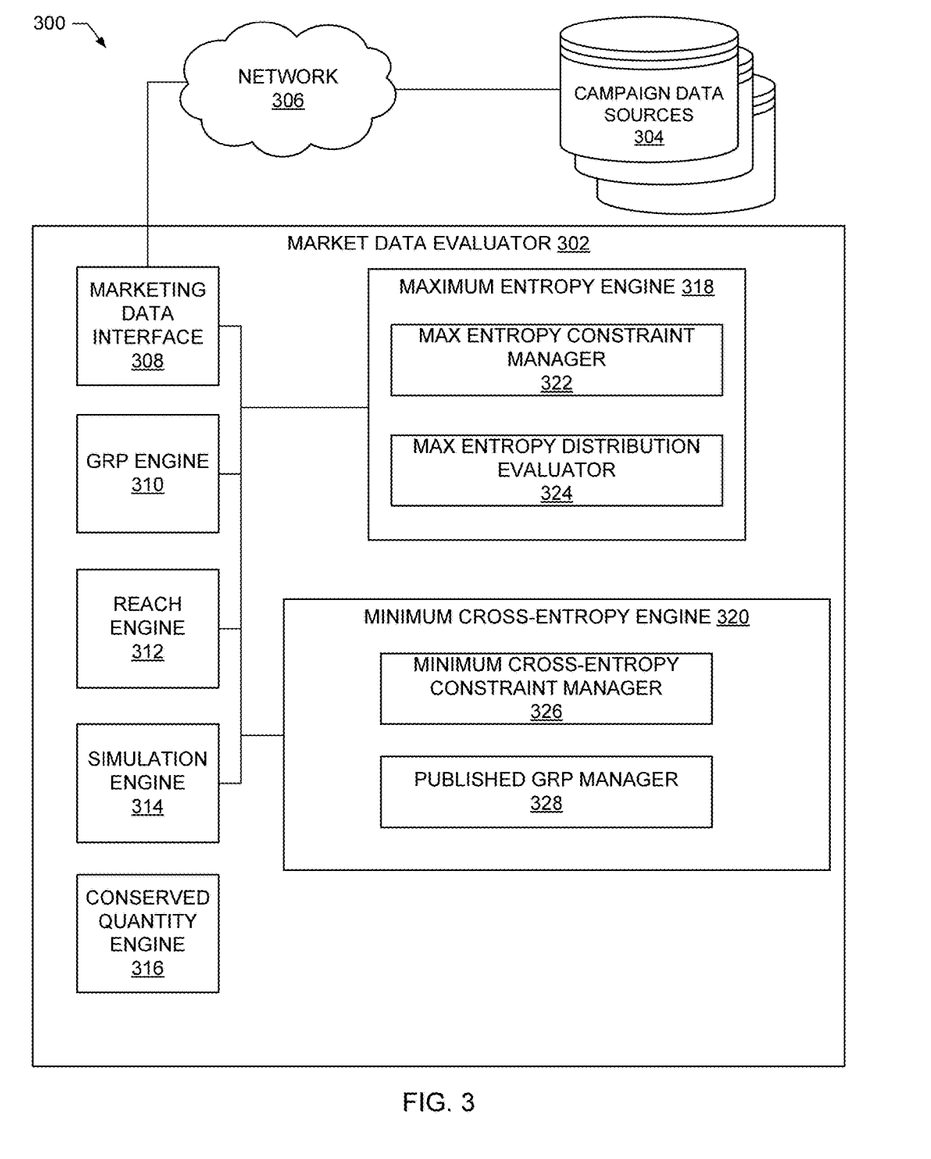
FIG. 3 is a schematic illustration of an example market data evaluator system to improve reach calculation efficiency.

Examples disclosed herein do not presuppose a distribution and attempt to fit the market data thereto, but rather generate one or more alternate distributions based on the available data. FIG. 3 illustrates an example market data evaluator (MDE) system 300 that includes an MDE 302 communicatively connected to one or more campaign data sources 304 via an example network 306. In the illustrated example of FIG. 3, the MDE 302 includes a marketing data interface 308, an example gross rating point (GRP) engine 310, an example reach engine 312, an example simulation engine 314, an example conserved quantity engine 316, an example maximum entropy (ME) engine 318, and an example minimum cross entropy (MCE) engine 320. In the illustrated example of FIG. 3, the ME engine 318 includes an example maximum entropy (ME) constraint manager 322 and an example maximum entropy (ME) distribution evaluator 324. In the illustrated example of FIG. 3, the MCE engine 320 includes an example MCE constraint manager 326 and an example published GRP manager 328.

In operation, the example marketing data interface 308 retrieves a dataset having an unknown distribution, such as market data associated with one or more of the campaign data sources 304. The dataset may represent market behavior activity such as, but not limited to, impression count data associated with promotional activity in which particular participants of a population are exposed to advertisements. The example GRP engine 310 calculates a corresponding GRP value associated with the dataset in a manner consistent with example Equation 1, and the example reach engine 312 calculates a corresponding reach value in a manner consistent with example Equation 2. In some examples, GRP and reach values that have been calculated from empirical datasets are referred to as raw GRP values and raw reach values. On the other hand, in the event an analyst wishes to use the empirical dataset to scale-up to a proposed/candidate published GRP value, which is not based on empirically collected data, then traditional techniques employed the NBD model, as described above.

The example simulation engine 314 selects a candidate published GRP value of interest as a scaling-up value, and the maximum entropy engine 318 estimates a distribution using the principal of maximum entropy to generate a maximum entropy distribution. Generally speaking, entropy quantifies an uncertainty involved in predicting a value of a random variable. Entropy reflects an expected value (E) of information (X), as shown by example Equation 12.

$$H(X) = E[I(X)] \qquad \text{Equation 12}$$
$$= \sum_i P(x_i)I(x_i)$$
$$= -\sum_i P(x_i)\log_b P(x_i).$$

The principle of maximum entropy states that a probability distribution that best represents the current state of knowledge is the one having the largest entropy. While an analyst goal may be to reduce uncertainty in any prediction made, examples disclosed herein first establish a foundation of being maximally uncertain about what we do not know. Because entropy is maximum when all outcomes are equally likely, any instance that deviates from equally likely outcomes reduces the entropy by introducing information to a distribution.

The example ME constraint manager 322 establishes constraints for the provided distribution to prevent computational waste, as shown by example Equations 13 and 14.

$$\sum_{k=0}^{\infty} q_k = 1. \qquad \text{Equation 13}$$

$$\sum_{k=0}^{\infty} kq_k = u_1. \qquad \text{Equation 14}$$

In the illustrated examples of Equations 13 and 14, three constraints include (a) $q_0$ is a known constraint (also reflects a shorthand notation for a probability at zero, which is 1-reach), (b) sums are expected to reach 100%, and $\mu_1$ is an expected value mean, which is sometimes referred to as a sample GRP or the empirically known GRP. Additionally, $q_k$ reflects a reach value at a $k^{th}$ frequency. At least one additional benefit of the example ME constraint manager 322 establishing the constraints in a manner consistent with example Equations 13 and 14 is that only positive values result for a probability set. This also ensures that any impossibility region(s) will not affect prediction accuracy.

The example ME distribution evaluator 324 applies the principle of maximum entropy to the distribution in a manner consistent with example Equation 15.

$$\text{maximize } Q \rightarrow H = -\sum_{k=0}^{\infty} q_k \log(q_k). \qquad \text{Equation 15}$$

In the illustrated example of Equation 15, Q reflects a reach distribution with a maximized entropy (H). Example Equation 15 is solved to generate a zero-modified geometric distribution using the known values for the sample reach for a probability at zero ($q_0$) and the sample GRP ($\mu_1$). In particular, the example ME constraint manager 322 facilitates (e.g., based on the constraints of (a) $\mu_1$, (b) $q_0$, (c) $\mu_2$ and (d) the sum equaling 100%) cross entropy calculations in a manner consistent with example Equations 16, 17 and 18, in which the cross entropy calculations consider a published GRP that may be achieved by the market analyst.

$$q_k = Cr^k \text{ where } k = 1, 2, \ldots, \infty. \qquad \text{Equation 16}$$

$$C = \frac{(1-q_0)^2}{u_1 + q_0 - 1}. \qquad \text{Equation 17}$$

$$r = \frac{u_1 + q_0 - 1}{u_1}. \qquad \text{Equation 18}$$

The illustrated example of Equation 16 reflects the prior distribution and in example Equation 17, C reflects one of two constants to facilitate cross entropy calculations, and in the illustrated example of Equations 16, 17 and 18, r reflects the second of two constants to facilitate cross entropy calculations of the geometric maximum entropy distribution.

The example MCE engine 320 modifies the maximum entropy distribution generated by the ME engine 318 with the principle of minimum cross entropy to create a new distribution that is constrained by the candidate published GRP of interest. In particular, the example MCE constraint manager 326 establishes constraints for applying the minimum cross entropy as shown by example Equations 19 and 20.

$$\sum_{k=0}^{\infty} p_k = 1. \qquad \text{Equation 19}$$

$$\sum_{k=0}^{\infty} kp_k = u_2. \qquad \text{Equation 20}$$

Note that example Equations 19 and 20 are similar to example Equations 13 and 14, but the former reflect constraints of reach values (p) at different frequencies (k) and the published/target/candidate GRP ($u_2$).

The example MCE engine 320 applies a minimum cross entropy function based on (a) the maximum entropy distribution (Q) and (b) the unknown distribution to be solved (P), as shown in example Equation 21.

$$\text{minimize } P \rightarrow D(P:Q) = p_0 \log\left(\frac{p_0}{q_0}\right) + \sum_{k=1}^{\infty} p_k \log\left(\frac{p_k}{Cr^k}\right). \qquad \text{Equation 21}$$

In the illustrated example of Equation 21, $q_0$ reflects the sample reach at a probability of zero, $p_0$ reflects the published reach at a probability of zero, constraint values C and rare known from before, and $p_k$ is the unknown reach values at the $k^{th}$ frequency to solve for. In some examples, the minimum cross entropy is calculated as a measure of the difference between two probability distributions in a manner consistent with Kullback-Leibler (KL) divergence. The KL divergence is a measure of information gained between distributions. The example MCE engine 320 integrates assistance values with zero-modified geometric constraints in a manner consistent with example Equations 22 and 23.

$$p_0 = s_0 q_0 \qquad \text{Equation 22.}$$

$$p_k = s_0 s_1^k Cr^k \text{ where } k=1,2,\ldots,\infty \qquad \text{Equation 23}$$

In the illustrated examples of Equations 22 and 23, $s_0$ and $s_1$ are solved to satisfy the constraints, as described in further detail below, and explicitly identified values of $p_0$ will guarantee a unique solution. One or more desired values for $p_k$ can be solved by way of example Equations 16-18.

As described above, solving for $s_1$ to facilitate an integration of the published GRP constraint employs the example published GRP manager 328, which solves $s_1$ in a manner consistent with example Equation 24.

$$1 = \sum_{k=0}^{\infty} p_k = p_0 + \sum_{k=1}^{\infty} \frac{p_0}{q_0} s_1^k Cr^k = \qquad \text{Equation 24}$$
$$p_0 - \frac{Cp_0 rs_1}{q_0(rs_1 - 1)} \Rightarrow s_1 = \frac{p_0 q_0 - q_0}{r(-Cp_0 + p_0 q_0 - q_0)}.$$

With all of the constraints and assistance values solved (including $s_1$), the example published GRP manager 328 integrates the published GRP constraints in a manner consistent with example Equation 25.

$$u_2 = \sum_{k=0}^{\infty} kp_k = 0 + \sum_{k=1}^{\infty} k\frac{p_0}{q_0} s_1^k Cr^k = \qquad \text{Equation 25}$$
$$\sum_{k=1}^{\infty} k\frac{p_0}{q_0}\left(\frac{p_0 q_0 - q_0}{r(-Cp_0 + p_0 q_0 - q_0)}\right)^k Cr^k =$$
$$-\frac{(q_0 - 1)(Cq_0 + p_0(-q_0) - p_0)}{Cq_0}.$$

The example conserved quantity engine 316 further simplifies to example Equations 26, 27 and 28 to solve for the published reach value to illustrate that quantities can be conserved for values of raw GRP, raw reach, published GRP and published reach.

$$u_2 = \frac{(p_0 - 1)(p_0(u_1 q_0 + q_0 - 1) - q_0(u_1 + q_0 - 1))}{p_0(q_0 - 1)^2}. \qquad \text{Equation 26}$$

$$\frac{(u_1 + q_0 - 1)q_0}{1 - q_0} = \frac{(u_2 + p_0 - 1)p_0}{1 - p_0}. \qquad \text{Equation 27}$$

-continued $$\frac{\left(\frac{u_1}{1-q_0}-1\right)}{\left(\frac{1-q_0}{q_0}\right)} = \frac{\left(\frac{u_2}{1-p_0}-1\right)}{\frac{1-p_0}{p_0}}.$$  Equation 28

From example Equation 28, because the form of the equation is similar on both sides, and each individual side only contains variables of either the prior and unknown, the example conserved quantity engine 316 generates conserved quantity equivalent expressions. In particular, u reflects a mean (M), which is also referred to as a GRP, R reflects a reach value, which can also be expressed as $1-q_0$, and F reflects a frequency, which can also be expressed as a ratio of the mean and reach (e.g., $u/1-q_0$). An example equivalent expression for mean (M) and reach (R) generated by the example conserved quantity engine 316 is shown in example Equation 29.

$$\frac{(M-R)(1-R)}{R^2}.$$  Equation 29

An example equivalent expression for mean (M) and frequency (F) generated by the example conserved quantity engine 316 is shown in example Equation 30.

$$\frac{(F-1)(F-M)}{M}.$$  Equation 30

An example equivalent expression for reach (R) and frequency (F) generated by the example conserved quantity engine 316 is shown in example Equation 31.

$$\frac{(F-1)(1-R)}{R}.$$  Equation 31

To illustrate a computational improvement of using the conserved quantities of derived example Equations 29-31 over the relatively more computationally burdensome NBD approach, in which a simultaneous system of equations must be solved, assume an initial raw GRP value of 350 and a corresponding reach of 70. The raw GRP and reach values are derived from empirically obtained market data. Also assume that a campaign manager, market researcher, or other individual/entity determines that a future campaign could be initiated to result in a published/new GRP value of 400, for which empirically obtained market data is not available. Assuming that the market researcher first employed the traditional NBD approach, a computationally intensive system of nonlinear equations would need to be solved in a manner consistent with example Equations 4 and 5 described above. Parameters of the NBD model result in a=5.393285 and k=0.648955. Knowing the value for parameter k, scaled-up parameter A (or $a_2$) can be determined in view of the published GRP value to yield a value of 6.163. Finally, knowing A and k, the new/published reach value can be solved in a manner consistent with example Equation 7 to yield a new published reach of 72.1%.

However, taking the same initial raw GRP value of 350 and corresponding initial raw reach value of 70, with a published GRP of 400 expected as a viable target for a future campaign, examples disclosed herein facilitate calculation via closed-loop conserved quantity expressions that yield substantially similar results. In particular, example Equation 29 is shown below using the GRP and reach values of interest, expressed as example Equation 32.

$$\frac{(M_1-R_1)(1-R_1)}{R_1^2} = \frac{(M_2-R_2)(1-R_2)}{R_2^2}.$$  Equation 32

In the illustrated example of Equation 32, $M_1$ reflects the raw GRP of 350, $R_1$ reflects the raw reach of 70, $M_2$ reflects the published GRP of 400, and $R_2$ reflects the published reach, which is solved below and shown as example Equation 33.

$$\frac{(3.50-0.70)(1-0.70)}{(0.70)^2} = \frac{(4.00-R_2)(1-R_2)}{R_2^2}.$$  Equation 33

Solving for R2 in example Equation 33 yields a published reach of 72.5%, which is substantially the same value as determined via the relatively more computationally complex NBD approach. Additionally, by using the conserved quantity equivalent expression approach disclosed herein, problems associated with the NBD are avoided, such as effects of the NBD-impossibility regions, assumptions of a distribution shape being an appropriate fit for unknown data and/or resorting to a Poisson distribution, which pays no regard to original distribution inputs.

Examples disclosed above consider an upper bound that is infinite, while examples disclosed below assume a maximum number of "spots" (e.g., television spots, advertising spots, Internet placement spots, etc.) that can be used in a particular calculation. As such, any GRP value has a maximum consistent with example Equation 34.

Reach≤GRP≤N*Reach  Equation 34.

In the illustrated example of Equation 34, N represents a finite number of spots in which the left-hand side of Equation 34 must be true while the right-hand side of Equation 34 is assumed. For example, in the event it is assumed a reach of 100%, then everybody is watching (e.g., watching television), and the inequality reduces to example Equation 35.

1≤GRP≤N  Equation 35.

In the illustrated example of Equation 35, the left-hand side of the inequality states that viewers watch at least one spot, and the right-hand side of the inequality illustrates that every viewer is watching every possible spot. Examples described below account for a bounded GRP value by a numerical solution.

Similar to examples disclosed above, parameters from the NBD for the raw reach and GRP are calculated and scaled-up to that the expected value of the new NBD matches the published reach. However, for a finite number of spots, the expected value of the first N spots may not equal the published reach value, thus the distribution is both truncated and modified so that the domain is the first N spots and the expected value within those N spots equals the published reach. To illustrate, an interim GRP is defined in a manner consistent with example Equation 36.

$$\text{Interim } GRP = \sum_{k=1}^{N} kf(k).$$  Equation 36

The interim GRP is employed to define a scale factor in a manner consistent with example Equation 37.

$$\text{Factor} = \frac{\text{Published } GRP}{\text{Interim } GRP}. \qquad \text{Equation 37}$$

For frequencies greater-than or equal to one (k≥1), each proportion is multiplied by the factor in a manner consistent with example Equation 38.

$$g(k) = (\text{Factor})f(k) \qquad \text{Equation 38.}$$

The zero frequency is then defined in a manner consistent with example Equation 39.

$$g(0) = 1 - \sum_{k=1}^{N} g(k). \qquad \text{Equation 39}$$

Accordingly, the published reach is represented in a manner consistent with example Equation 40.

$$\text{Published Reach} = 1 - g(0) \qquad \text{Equation 40.}$$

The above examples take into account a finite value of N and results in the expected value equal to the published GRP, but the raw and published values are treated as two different distributions. Improved approaches include assuming both distributions are truncated NBDs and fitting the data to both. As described above in connection with example Equations 13-15, an unknown distribution (X) is estimated using maximum entropy given the constraint that $E[X]=\mu_1$ and $q_0=P(X=0)$. However, unlike example Equations 13-15 above, the domain is specified in a finite manner to be $\{0, 1, \ldots, N\}$.

Additionally, finite domain examples include creating a new distribution with minimum cross entropy in a manner similar to example Equations 19-21, in which the domain is again specified in a finite manner to be $\{0, 1, \ldots, N\}$. Numerical solution of the published reach (p0) may be solved in a manner consistent with example Table 2, in which the answer depends only upon (a) a raw GRP value, (b) a raw reach value and (c) a published GRP value. In particular, example Table 2 illustrates pseudo code that may be employed by the example MDE system 300. The example pseudo code of Table 2 facilitates handling both distributions as a finite domain to find the best distribution that fits the known data.

TABLE 2

```
Raw_GRP=50;   % (μ₁)
Raw_Reach=30;   % (q0)
Published_GRP=200 %  (μ₂)
N=20; % Maximum number of "spots"
% Construct constraints finite domain Maximum
Entropy
C=[ones(1,N+1)];
    0:N;
    1 zeros (1, N)];
D=[1; (Raw_GRP/100); 1–(Raw_Reach/100)];
%Solve for prior distribution
Q=MaxEnt(C,D);
%New constraints
C=[ones(1,N+1);
    0:N];
```

TABLE 2-continued

```
D=[1, (Published_GRP/100)];
%Solve for prior distribution
P=MaxEnt(C,D,Q);
Published_Reach=100*(1–P(1));
```

In the illustrated example of Table 2, variable C represents a constraint matrix, not to be confused with variable C in example Equation 17, which represents a constant. Additionally, the pseudo code "P=MaxEnt(C, D, Q)" represents solving for the minimum cross entropy solution. As described in the illustrated example of FIG. 7, solutions to the question of how a published reach depends on a function of raw reach is shown in view of an (a) NBD approach, (b) a maximum entropy approach, (c) an NBD approach with finite correction (e.g., the industry standard), and (d) a maximum entropy approach with a finite domain (e.g., via numerical analysis consistent with example pseudo code of Table 2).

While an example manner of implementing the market data evaluator (MDE) of FIG. 3 is illustrated in FIG. 3, one or more of the elements, processes and/or devices illustrated in FIG. 3 may be combined, divided, re-arranged, omitted, eliminated and/or implemented in any other way. Further, the example marketing data interface 308, the example GRP engine 310, the example reach engine 312, the example simulation engine 314, the example conserved quantity engine 316, the example maximum entropy engine 318, the example minimum cross entropy engine 320, the example maximum entropy constraint manager 322, the example maximum entropy distribution evaluator 324, the example minimum cross entropy constraint manager 326, the example published GRP manager 328 and/or, more generally, the example market data evaluator (MDE) 302 of FIG. 3 may be implemented by hardware, software, firmware and/or any combination of hardware, software and/or firmware. Thus, for example, any of the example marketing data interface 308, the example GRP engine 310, the example reach engine 312, the example simulation engine 314, the example conserved quantity engine 316, the example maximum entropy engine 318, the example minimum cross entropy engine 320, the example maximum entropy constraint manager 322, the example maximum entropy distribution evaluator 324, the example minimum cross entropy constraint manager 326, the example published GRP manager 328 and/or, more generally, the example market data evaluator (MDE) 302 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example marketing data interface 308, the example GRP engine 310, the example reach engine 312, the example simulation engine 314, the example conserved quantity engine 316, the example maximum entropy engine 318, the example minimum cross entropy engine 320, the example maximum entropy constraint manager 322, the example maximum entropy distribution evaluator 324, the example minimum cross entropy constraint manager 326, the example published GRP manager 328 and/or, more generally, the example market data evaluator (MDE) 302 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example MDE 302 of FIG. 3 may include one or more elements, processes and/or devices in addition to, or instead of, those illustrated in FIG. 3, and/or may include more than one of any or all of the illustrated elements, processes and devices.

Figure 4:
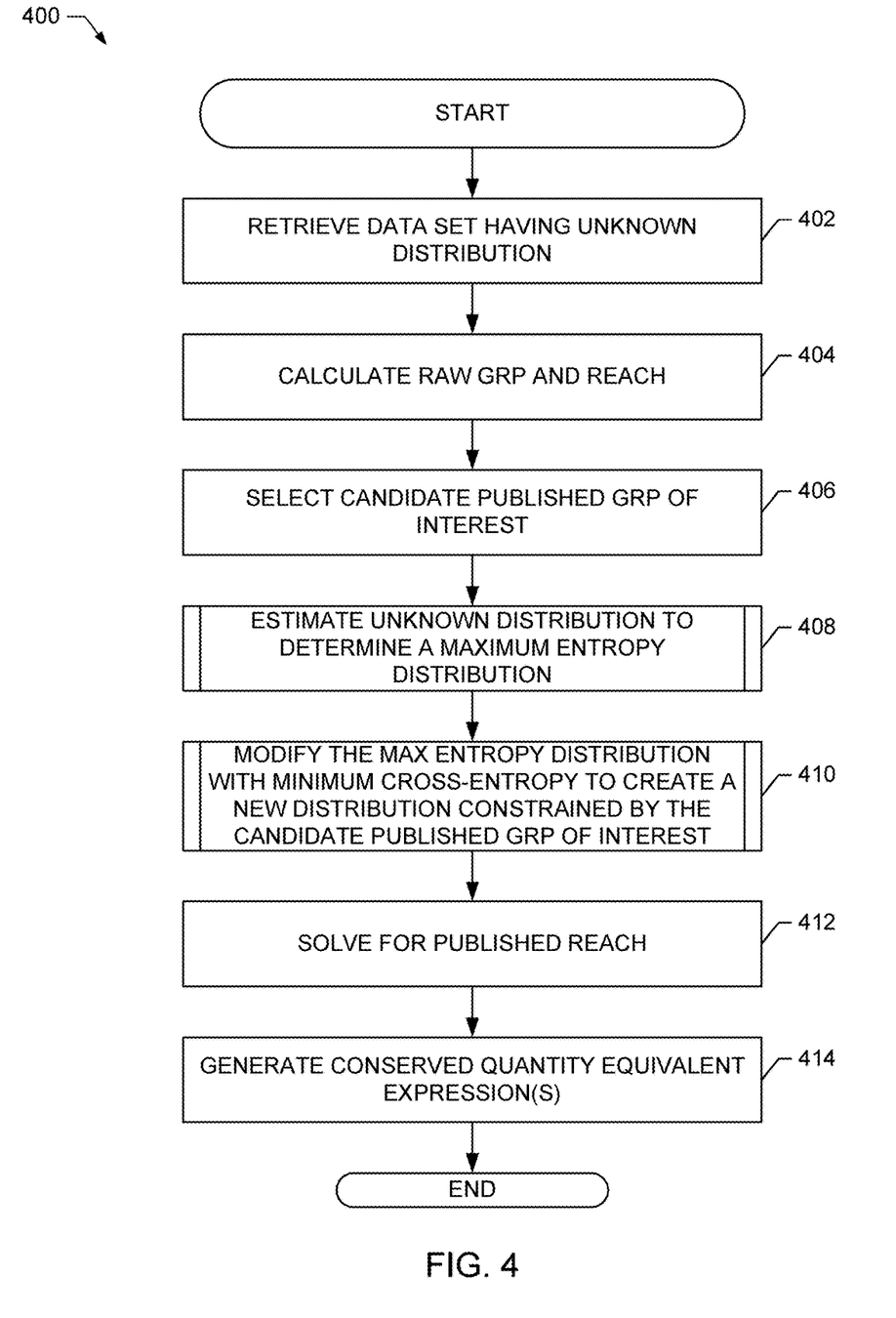
FIGS. 4-6 are flowcharts representative of example machine readable instructions that may be executed to implement the example market data evaluator system of FIG. 3 to improve reach calculation efficiency.
Figure 5:
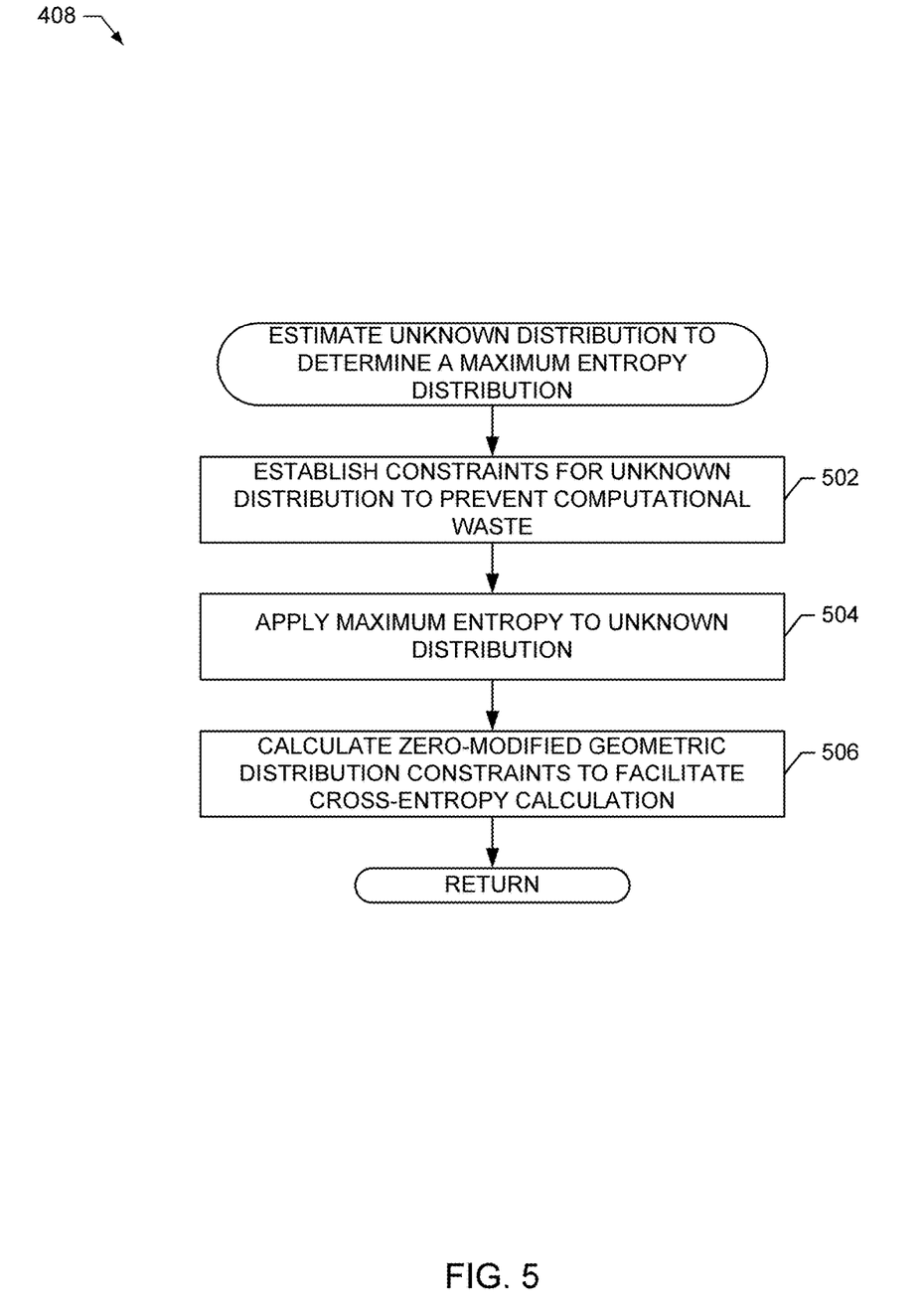
Figure 6:
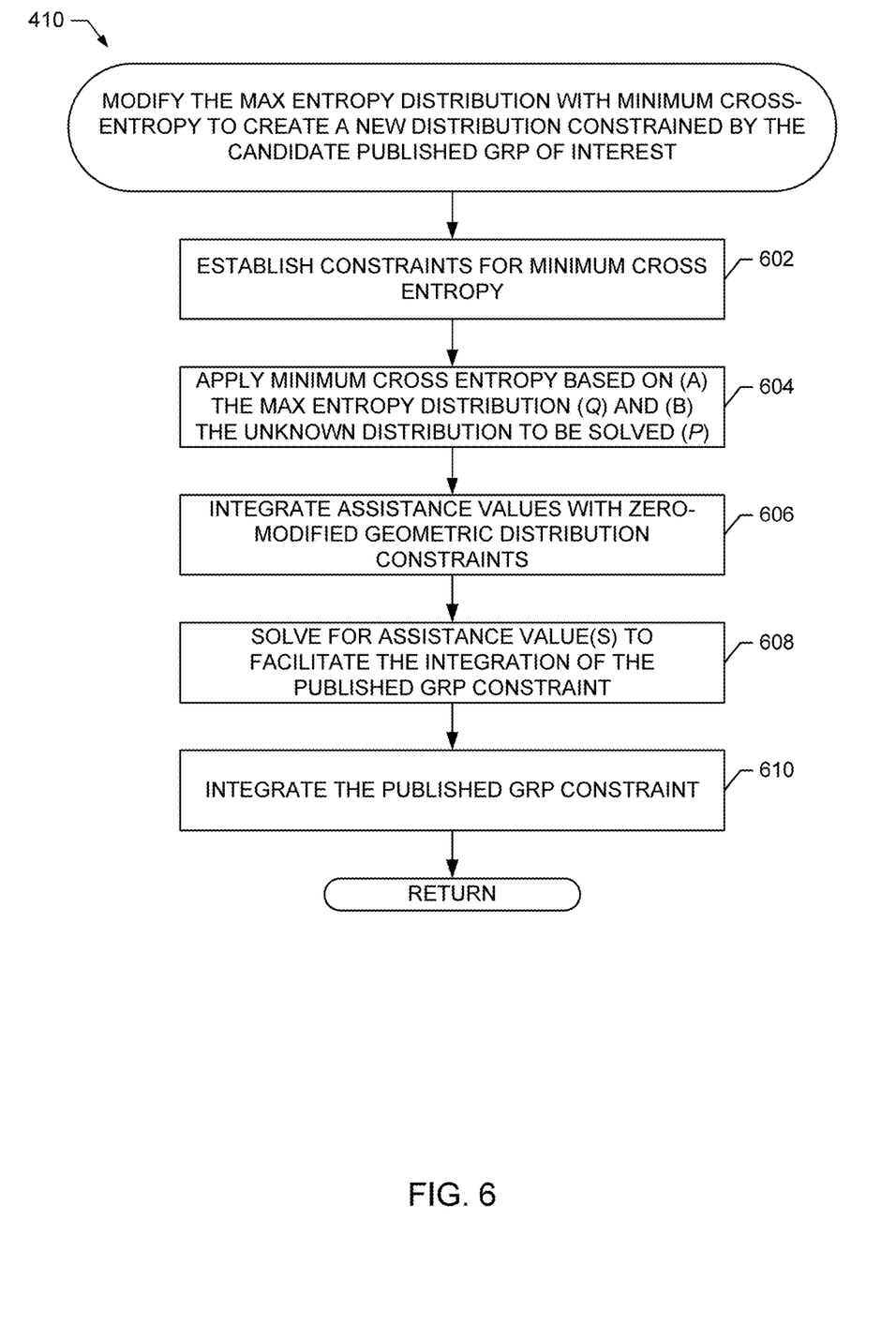

Flowcharts representative of example machine readable instructions for implementing the MDE system 300 of FIG. 3 are shown in FIGS. 4-6. In these examples, the machine readable instructions comprise a program for execution by a processor such as the processor 812 shown in the example processor platform 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program(s) is/are described with reference to the flowcharts illustrated in FIGS. 4-6, many other methods of implementing the example MDE 302 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 400 of FIG. 4 begins at block 402 where the example marketing data interface 308 retrieves and/or otherwise receives a data set having an unknown distribution of marketing data. Such data set(s) may be retrieved from one or more campaign data sources 304 via the example network 306, in which the data set(s) include campaign results associated with one or more promotions. In some examples, the data set(s) include information related to a campaign population size and corresponding information to indicate which ones of the campaign population were exposed to promotional media (e.g., billboard advertisements, television advertisements, Internet advertisements, etc.). The example GRP engine 310 calculates a GRP value associated with the empirically derived data set, and the example reach engine 312 calculates a corresponding reach value (block 404).

While the empirically determined GRP and reach values provide the market analyst with a measurement to indicate a number of impressions the population experienced, and an indication of how many of those impressions were unique, the market analyst also seeks to know how the reach will be affected in the event a new GRP value (published GRP) is achieved for that defined population. As described above, the market analyst may identify and/or otherwise select a new/published GRP value that can be targeted to the defined population. In some examples, the market analyst can apply marketing resources to the defined population (e.g., increased advertising budget, additional media advertisements, etc.) with an expectation that a resulting published GRP value is achieved. However, because the data set associated with the defined population reflects empirical data associated with the original campaign, any determination of a new/published reach value in view of the published GRP value must be predicted and/or otherwise estimated. As described above, conventional techniques to predict the published reach utilize computationally intensive nonlinear techniques to achieve convergence when applying the NBD. Further, particular circumstances of the NBD cause computational failures, despite real-world inputs that are practically observed in market behavior.

The example simulation engine 314 selects and/or otherwise retrieves a published GRP of interest (block 406), and the example maximum entropy engine 318 estimates an unknown distribution (e.g., the empirical market data set) to determine a maximum entropy distribution (block 408).

FIG. 5 includes additional detail associated with determining the maximum entropy distribution of block 408. In the illustrated example of FIG. 5, the example maximum entropy constraint manager 322 establishes constraints for the unknown distribution to prevent computational waste (block 502), which may be achieved in a manner consistent with example Equations 13 and 14 described above. In particular, the maximum entropy constraint manager 322 prevents computational waste by ensuring that only positive values are produced for a probability set, thereby avoiding potential impossibility region(s), such as those that produce errors in an NBD model (see region 208 of FIG. 2). The example maximum entropy distribution evaluator 324 calculates a maximum entropy to the unknown distribution (block 504) in a manner consistent with example Equation 15, and the example maximum entropy constraint manager 322 calculates zero-modified geometric distribution constraints to facilitate cross entropy calculations (block 506), as described in further detail below.

Returning to FIG. 4, the example minimum cross entropy engine 320 modifies the calculated zero-modified geometric distribution now representing a maximum entropy condition with minimum cross entropy to create a new distribution that is constrained by the published GRP of interest (block 410). FIG. 6 includes additional detail associated with applying the minimum cross entropy of block 410. In the illustrated example of FIG. 6, the example minimum cross entropy constraint manager 326 establishes constraints for calculating the minimum cross entropy (block 602) in a manner consistent with example Equations 19 and 20. Unlike conventional techniques, the example minimum cross entropy engine 320 applies the minimum cross entropy based on available data under consideration rather than forcing such data to fit within a predetermined distribution. In particular, the example minimum cross entropy engine 320 applies the minimum cross entropy based on (a) the previously calculated maximum entropy distribution (Q) and (b) the unknown distribution to be solved (P) (block 604) in a manner consistent with example Equation 21. Additionally, the example minimum cross entropy engine 320 integrates assistance values with zero-modified geometric distribution constraints (block 606) in a manner consistent with example Equations 22 and 23. The example published GRP manager 328 solves for the assistance values (e.g., s1) to facilitate the integration of the published GRP constraint of interest (block 608) in a manner consistent with example Equation 24. Additionally, the example published GRP manager 328 integrates the published GRP constraint (block 610) in a manner consistent with example Equation 25.

Returning to FIG. 4, the example conserved quantity engine 316 solves for the published reach (block 412) in a manner consistent with example Equations 26-28. In particular, because the conserved quantities are similar on both sides of example Equation 28, desired quantities of interest can be solved for via closed-form conserved quantity equivalent expressions (block 414), which are less computationally rigorous than conventional methods that employ the NBD.

Figure 7:
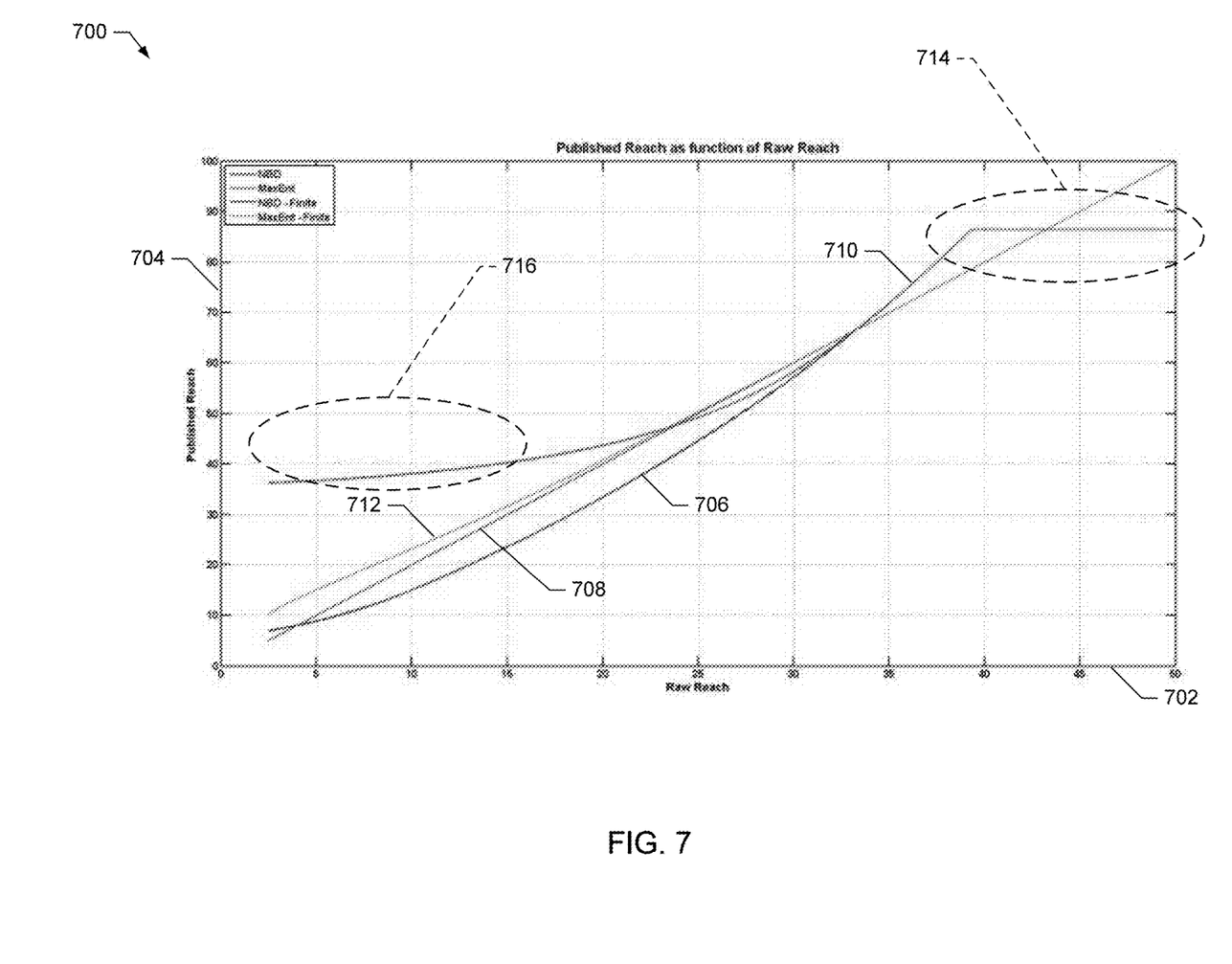
FIG. 7 is a chart of example solutions to determine a published reach as a function of raw reach.

FIG. 7 is a chart 700 to illustrate example solutions to determine a published reach as a function of raw reach. In the illustrated example of FIG. 7, a given raw GRP value is 50 having a corresponding published GRP of 200. The example chart 700 includes an x-axis of raw reach 702 and a y-axis of published reach 704. The example chart 700 illustrates (a) an NBD solution 706, (b) a maximum entropy solution 708, (c) an NBD solution using finite correction 710, and (d) a maximum entropy solution using a finite domain 712. As described above, the NBD solution 706 and the NBD solution using finite correction 710 break down at particular values of raw reach, as shown in the chart 700 as a breakdown region 714. Such breakdowns, when encountered by traditional industry standard approaches sometimes revert to a Poisson analysis, which are completely independent of any actual observations available. In fact, such solutions remain constant and independent of any changes to the raw reach value(s). Stated differently, the Poisson analysis discards any panel data that may have been available during the analysis. On the other hand, examples disclosed herein that employ the maximum entropy solution 708 and the maximum entropy finite domain solution 712 do not break down and, instead, converge. Additionally, the solution for the NBD using finite correction (710) breaks down at a low raw reach region 716. However, example solutions disclosed herein (e.g., the maximum entropy solution 708 and the maximum entropy solution using a finite domain 712) corrects for break downs at both extremes of raw reach. As the raw reach approaches a lower (toward zero) boundary, examples disclosed herein converge toward the origin, while traditional techniques converge to erroneous non-zero values (e.g., predicting that reach is approximately 40% when an accurate value is closer to 1%). In other words, if zero people were watching television (raw value), then a corresponding reach value is also expected to be at or near zero, rather than the erroneous traditional technique that illustrates approximately 40%.

Figure 8:
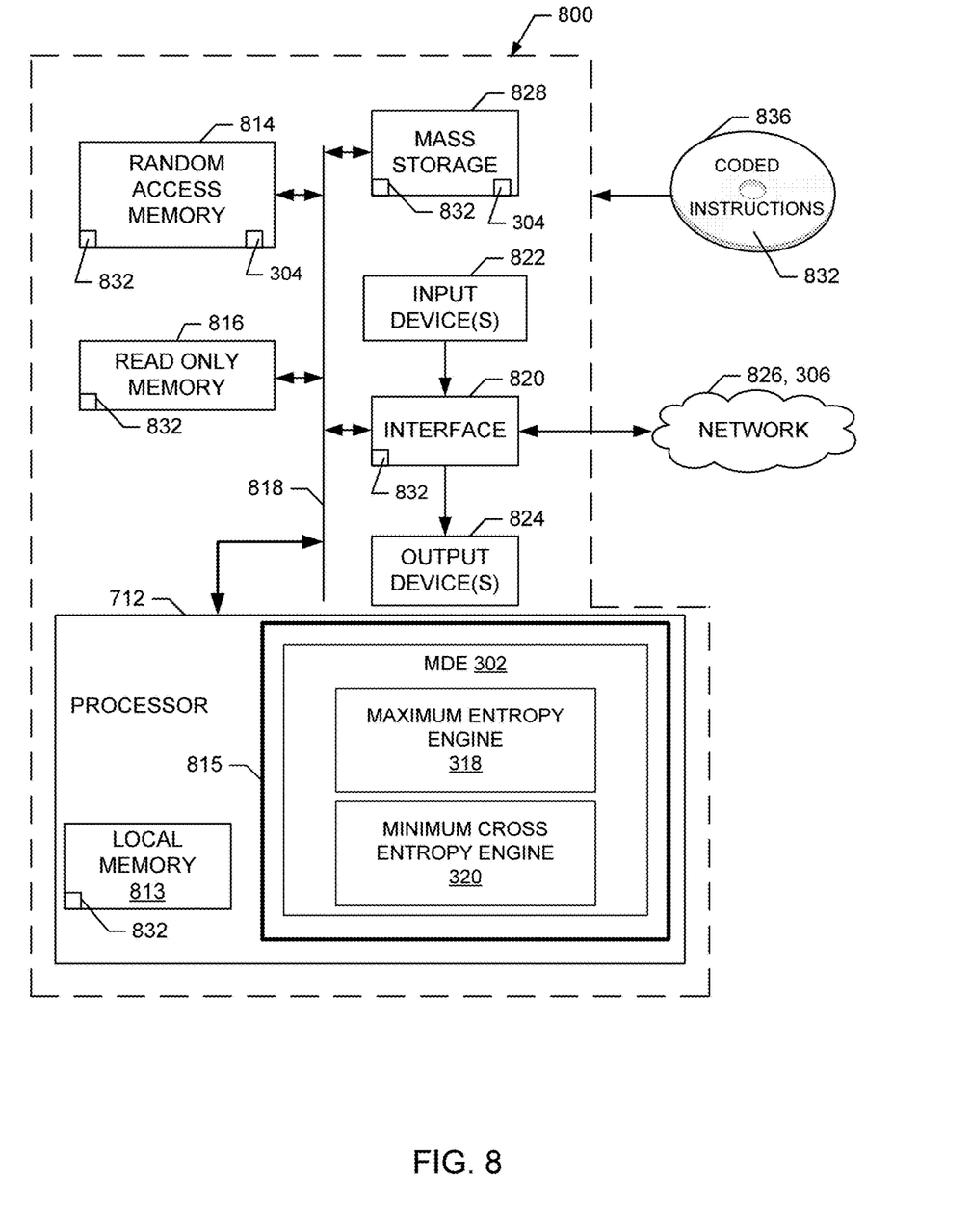
FIG. 8 is a block diagram of an example processor platform structured to execute the example machine readable instructions of FIGS. 4-6 to implement the example market data evaluator system of FIG. 3.

FIG. 8 is a block diagram of an example processor platform 800 capable of executing the instructions of FIGS. 4-6 and/or the example pseudo code of Table 2 to implement the market data evaluator system 300 and, in particular, the MDE 302 of FIG. 3. The processor platform 800 can be, for example, a server, a personal computer, a mobile device (e.g., a cell phone, a smart phone, a tablet such as an iPad™), a personal digital assistant (PDA), an Internet appliance, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 832, which include the example instructions of FIGS. 4-6 and pseudo code of Table 2 to implement the example MDE 302 of FIG. 3.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint, a voice recognition system and/or any other human-machine interface.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 4-6 and/or pseudo code of Table 2 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture overcome computationally intensive processing of systems that calculate reach values for market data. Additionally, examples disclosed herein eliminate inherent limitations of conventional industry standard techniques when calculating published reach values in connection with published GRP values, particularly in regard to applications of the NBD. Examples disclosed herein eliminate a need to perform iterative nonlinear techniques to produce convergence in market data distributions and, instead, facilitate closed-form expressions to calculate published GRP, published reach and/or published frequency estimates.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer-implemented method to improve an efficiency of determining a published reach, comprising:
   identifying, by executing an instruction with at least one processor, a negative binomial distribution feasibility region corresponding to a candidate gross rating point (GRP) value;
   in response to identifying the negative binomial distribution feasibility region is associated with a number of samples below a threshold, estimating, by executing an instruction with the at least one processor, a sample distribution of marketing data to generate a maximum entropy distribution, the maximum entropy distribution being constrained by a first GRP value and a first reach value, the first GRP value empirically measured, the first GRP value corresponding to the sample distribution of marketing data, the first reach value based on the first GRP value;
   generating, by executing an instruction with the at least one processor, a geometric distribution based on estimating a minimum cross entropy of (a) the maximum entropy distribution and (b) the sample distribution of marketing data, the minimum cross entropy being constrained by the candidate GRP value of the sample distribution of marketing data, the candidate GRP value based on an advertising campaign increase quantity;
   determining, by executing an instruction with the at least one processor, a model of the candidate GRP value, the model based on an assistance value corresponding to the candidate GRP value; and
   reducing a computational burden associated with determining the published reach of the sample distribution of marketing data by generating, by executing an instruction with the at least one processor, closed-loop conserved quantity expressions of the geometric distribution based on the model of the candidate GRP value.

2. The computer-implemented method as defined in claim 1, wherein the first GRP value and the first reach value are constrained for a probability of zero advertising impressions associated with the sample distribution.

3. The computer-implemented method as defined in claim 1, wherein estimating the minimum cross entropy includes applying a Kullback-Leibler divergence probability.

4. The computer-implemented method as defined in claim 1, wherein the conserved quantity expressions associate at least one of (a) GRP and reach, (b) GRP and frequency, or (c) reach and frequency.

5. An apparatus to improve an efficiency of determining a published reach, comprising:
   a market data evaluator to identify a negative binomial distribution feasibility region corresponding to a candidate gross rating point (GRP) value;
   a maximum entropy engine to:
     in response to the market data evaluator identifying the negative binomial distribution feasibility region is associated with a number of samples below a threshold:
       generate a maximum entropy distribution, based on estimating a sample distribution of marketing data, the maximum entropy distribution constrained by a first GRP value and a first reach value, the first GRP value corresponding to the sample distribution of marketing data, the first reach value based on the first GRP value;
   a maximum entropy constraint manager to generate a geometric distribution based on estimating a minimum cross entropy of (a) the maximum entropy distribution and (b) the sample distribution of marketing data;
   a minimum cross entropy constraint manager to constrain the minimum cross entropy with the candidate GRP value of the sample distribution of marketing data, the candidate GRP value based on an advertising campaign increase quantity; and
   a conserved quantity engine to:
     determine a model of the candidate GRP value, the model based on an assistance value corresponding to the candidate GRP value; and
     reduce a computational burden associated with determining the published reach of the sample distribution of marketing data by generating closed-loop conserved quantity expressions of the geometric distribution based on the model of the candidate GRP value.

6. The apparatus as defined in claim 5, wherein the maximum entropy engine is to constrain the first GRP value and the first reach value for a probability of zero advertising impressions associated with the sample distribution.

7. The apparatus as defined in claim 5, further including a minimum cross-entropy engine to estimate the minimum cross entropy with a Kullback-Leibler divergence probability.

8. The apparatus as defined in claim 5, wherein the conserved quantity expressions associate at least one of (a) GRP and reach, (b) GRP and frequency, or (c) reach and frequency.

9. A tangible computer readable storage medium comprising instructions to improve an efficiency of determining a published reach that, when executed, causes a processor to, at least:
   identify a negative binomial distribution feasibility region corresponding to a candidate gross rating point (GRP) value;
   in response to identifying the negative binomial distribution feasibility region is associated with a number of samples below a threshold, estimate a sample distribution of marketing data to generate a maximum entropy distribution, the maximum entropy distribution being constrained by a first GRP value and a first reach value, the first GRP value empirically measured, the first GRP value corresponding to the sample distribution of marketing data, the first reach value based on the first GRP value;

generate a geometric distribution based on estimating a minimum cross entropy of (a) the maximum entropy distribution and (b) the sample distribution of marketing data, the minimum cross entropy being constrained by the candidate GRP value of the sample distribution of marketing data, the candidate GRP value based on an advertising campaign increase quantity;

determine a model of the candidate GRP value, the model based on an assistance value corresponding to the candidate GRP value; and reduce a computational burden associated with determining the published reach of the sample distribution of marketing data by generating closed-loop conserved quantity expressions of the geometric distribution based on the model of the candidate GRP value.

10. The tangible computer readable storage medium of claim 9, wherein the instructions, when executed, further cause the processor to constrain the first GRP value and the first reach value for a probability of zero advertising impressions associated with the sample distribution.

* * * * *